United States Patent [19]

Noguchi et al.

[11] Patent Number: 4,622,275

[45] Date of Patent: Nov. 11, 1986

[54] FUEL CELL POWER PLANT

[75] Inventors: Yoshiki Noguchi; Tadao Arakawa; Nobuo Nagasaki; Shigehisa Sugita, all of Hitachi; Masato Takeuchi, Katsuta, all of Japan

[73] Assignees: Hitachi, Ltd., Tokyo; Hitachi Engineering Co., Ltd., Ibaraki, both of Japan

[21] Appl. No.: 760,872

[22] Filed: Jul. 31, 1985

[30] Foreign Application Priority Data

Jul. 31, 1984 [JP] Japan ................................ 59-160680

[51] Int. Cl.$^4$ ............................................. H01M 8/06
[52] U.S. Cl. ........................................ 429/19; 429/26
[58] Field of Search ......................... 429/16, 17, 19, 26

[56] References Cited

U.S. PATENT DOCUMENTS

| 3,976,506 | 8/1976 | Landau | 429/19 |
| 4,001,041 | 1/1977 | Menard | 429/19 |
| 4,004,947 | 1/1977 | Bloomfield | 429/17 |
| 4,041,210 | 8/1977 | Dine | 429/16 |
| 4,128,700 | 12/1978 | Sederquist | 429/19 |

Primary Examiner—Donald L. Walton
Attorney, Agent, or Firm—Antonelli, Terry & Wands

[57] ABSTRACT

A fuel cell power plant comprising a fuel cell employing a molten carbonate as an electrolyte, a reformer for reforming fuel into a reactive gas to be supplied into the anode of the cell, an expansion turbine connected to a compressor, a combustor for burning a gas exhausted from the anode and introducing the combustion gas into the cathode of the fuel cell along with a gas compressed by the compressor, and a waste heat recovery system. The power plant is characterized by the provision of another combustor on the passage through which cathode exhaust gas is sent from the cathode to the turbine and a passage for leading a part of the anode exhaust gas to the combustor, whereby unburned gas, included in the anode exhaust gas, is burned with the cathode exhaust gas supplied as oxygen source so that the temperature of the turbine driving gas is raised, as a result, the overall thermal efficiency of the power plant increases.

6 Claims, 7 Drawing Figures

FUEL CELL POWER PLANT

BACKGROUND OF THE INVENTION

The present invention relates to a fuel cell power plant incorporating a fuel cell of the molten carbonate type which operates with an electrolyte such as sodium carbonate, potassium carbonate or the like in the molten state, and more particularly to an improvement of the overall thermal efficiency of the fuel cell power plant.

In a fuel cell known as a molten carbonate fuel cell, a carbonate such as lithium carbonate, potassium carbonate or the like is used as an electrolyte, and this type of fuel cell operates at 600 to 700° C., at which temperature the carbonate is molten. The molten carbonate type fuel cell exhibits a vigorous reaction because it operates at high temperatures; therefore, it does not require an expensive catalyst such as platnum. Also, the molten carbonate fuel cell can function with any of a wide selection of fuels, because it is not adversely affected by carbon monoxide which hinders the operation of the phosphate type fuel cell which has been developed recently. Also, this type of fuel is expected to operate at a thermal efficiency of 45% or higher, when used in combination with a coal gas process. For these reasons, the molten carbonate type fuel cell is attracting attention as a promising power generating sytem which is expected to be put into practical use in the next generation. In fact, this type of fuel cell has been called the fuel cell of the second age while the phosphate type fuel cell has been called the fuel cell of the first age.

In the operation of the molten carbonate fuel cell, hydrogen or a hydrogen-containing gas as a fuel or reactive gas is supplied to an anode, while a cathode is supplied with a mixture of air and carbon dioxide. The air and carbon dioxide supplied to the cathode receive electrons and produce carbonate ions which are introduced into an electrolyte. In the anode, the hydrogen reacts with the carbonate ions in the electrolyte and produces carbon dioxide and water, while emitting electrons. Thus, the molten carbonate fuel cell consumes carbon dioxide at its cathode and produces carbon dioxide and water at its anode. In the molten carbonate fuel cell, therefore, the reactive gas is diluted by carbon dioxide and water produced in the anode if the rate of utilization of the reactive gas, i.e., the ratio of the quantity of the reactive gas actually consumed in the anode to the quantity of reactive gas supplied to the anode, is increased. It is also known that an increase of the reactive gas utilization rate causes a drastic reduction in the concentration of the component of the reactive gas contributing to the reaction; hence a reduction in the output voltage and thermal efficiency of the fuel cell, because the reactive gas is consumed so quickly.

Thus, an increase in the fuel utilization rate reduces, as shown in FIG. 7, the efficiency of the cell expressed as (cell output power (KW)×860)/(reaction heat of reactive gas actually consumed in anode), so that the efficiency of the cell decreases as the rate of utilization of the fuel increases. Cell efficiency shown in FIG. 7 is based on a rate of fuel utilization of 50%.

The efficiency of installed fuel cells is represented by cell power (KW)×860/reaction heat of reactive gas supplied to the anode, and can be determined as (fuel cell efficiency) x (rate of utilization of reactive gas). To improve thermal efficiency of a fuel cell power plant in this configuration, attempts have been made to develop a fuel cell in which cell efficiency decreases only slightly even when the rate of utilization of the reactive gas increases, as well as a power generating system in which high thermal efficiency is obtained even at a reduced rate of fuel utilization by virtue of an increased heat recovery rate.

An example of a conventional fuel cell power plant with a heat recovery system is disclosed in "Fuel Cell Power Plant Integrated Systems Evaluation" of EPRI, January of 1981 (pages E-5 to E-9, particularly FIG. E-3). The fuel cell power plant shown in the FIG. E-3, includes a fuel cell, a turbine driving a compressor and a generator, a reformer for reforming fuel into a reactive gas, a combustor supplying the reformer with heat for effecting a reforming reaction, a heat recovery system and a drain separator for separating water from anode exhaust gas. The cathode of the fuel cell is supplied with a compressed air from a compressor and conbustion products from the combustor. A part of cathode exhaust gas is delivered to the turbine as a turbine driveing gas and drives it to thereby operate the compressor and the generator. Then the cathode gas is exhausted from the turbine. The turbine exhaust gas is sent to the waste heat recovery system. The remaining of the cathode exhaust gas is sent to the cathode as a cathode recirculated gas. The anode is supplied with a reactive gas, into which a fuel is reformed, after being heated by a heater or heat exchanger. Anode exhaust gas is fed to the combustor as a gas for combustion after passing through various heat exchangers and the drain separator (knockout drum), and is combusted under the presence of the compressed air from the compressor. The drain separator separates water from the anode exhaust gas. The water separated there is sent to the reformer in order to use it reforming the fuel after being heated by the heat recovery system and a heat exchanger.

In the fuel cell power described above, the temperature of the turbine driving gas, i.e., the cathode exhaust gas, ranges from 700° to 750° C., which is lower than the temperature of the gas supplied to the gas turbine which is ordinarily used. Therefore, the thermal efficiency of the turbine is comparatively low. The temperature of the turbine exhaust gas is as low as 300° to 400° C. Also, the steam generated in the waste heat recovery system has to be supplied as reforming steam to the reformer, so that there is not sufficient steam to drive a steam turbine if the turbine is provided for recovering heat. It is, therefore, quite difficult to recover the heat by means of a steam turbine.

Thus, in the described fuel cell power plant, the temperature of the turbine driving gas is so low that the thermal efficiency of the waste heat recovery system is inevitably low as compared with the gas turbine combination plant (gas turbine+steam turbine) which has been put into practical use. This undesirably impedes the improvement of the overall thermal efficiency of the fuel cell power plant, which is defined as follows:

overall efficiency of whole plant=electric ouput (fuel cell electric output+gas turbine electric output+steam turbine electric output) (KW)×860/ (fuel input heat (Kcal)/H) .

There is a conventional fuel cell power plant in which a coal gasification system and a steam turbine system are combined with the fuel cell power plant. In this plant, the anode of a fuel cell is supplied with a reactive gas which is formed by refining a crude gas made by gasification of a coal in a coal gasification system. Anode exhaust gas is burned with an air compressed by a compressor and the resultant combustion gas is sent to the cathode of the fuel cell. A part of the cathode exhaust gas is sent to an expansion turbine which drives the compressor and a generator. The turbine exhaust gas heats a condensate from the steam turbine system in the wast heat recovery system. A part of the heated condensate is sent to the coal gasification system and is evaporated in steam which is sent to a steam turbine after being superheated by the cathode exhaust gas, while the remaining is sent to the coal gasification system and then sent directly to another steam turbine.

In this fuel cell power plant having a coal gasification system, since the temperature of the gas supplied to the expansion turbine for driving it is low, the thermal efficiency of the gas turbine combined plant utilizing the heat possessed by the gas which drives the expansion turbine is lowered to reduce the overall thermal efficiency of the plant, as in the case of the first-mentioned fuel cell power generating plant.

Japanese Patent Publication No. 56231/1983 proposes supplying combustion air to the exhaust gas coming from the combustion section of a reformer in a power generating plant utilizing a phosphate type fuel cell, such as to burn the exhaust gas to raise the temperature, the exhaust gas, having had its temperature raised, being then supplied to the expansion turbine, thereby elevating the expansion turbine inlet gas temperature. This method, when applied to a power generating plant employing a molten carbonate type fuel cell, however, presents some problems. Since the combustion gas from the reformer cannot be used as the carbon dioxide to be supplied to the cathode, it is necessary to find a way to supply carbon dioxide. For instance, a part of the anode gas is bypasses and is burned in a catalytic combustor or the like to become carbon dioxide which is to be fed to the cathode. When the gas burned in the combustor is supplied to the cathode, it is necessary to cool the hot combustion gas down to the cell operating temperature. In view of this fact, heating said gas in the combustor serves no purpose.

The temperature of the cathode exhaust which gas depends on the cell operating temperature, is low. Therefore, when the cathode exhaust gas is mixed with the combustor exhaust gas and supplied to the expansion turbine, it is not possible to raise the turbine inlet gas temperature to a sufficiently high level. Therefore, in order for the gas temperature at the turbine inlet to be sufficiently high, the cathode exhaust gas is not suppled to the expansion turbine so that heat cannot be recovered from the cathode exhaust gas. Consequently thermal efficiency is disadvantageously reduced. Furthermore, since the compressor outlet air is the air to be supplied to the cathode, the temperature supplied to the cathode is 200° to 300° C. lower than the operating temperature of the cell, so that an additional supply of the fuel is required to heat the air.

Another example of a conventional fuel cell power plant is disclosed in U.S. Pat. No. 3,976,507, whereas the fuel power plant is provided with a compressor for compressing air to be led to the cathode of the fuel cell, a turbine driven by the exhaust gas exhausted from the anode thereby to drive the compressor, a catalytic burner for burning the anode exhaust gas with air compressed by the compressor, and an autothermal reactor for reforming fuel by using the cathode exhaust gas. The anode exhaust gas is burned by the catalytic burner, using the compressed air which has not passed through the cathode and is cool, and the combustion gas is led to the turbine to drive it.

SUMMARY OF THE INVENTION

An object of the invention is to provide a fuel cell power plant employing a molten carbonate fuel cell which is high in overall thermal efficiency.

According to the present invention, a fuel cell power plant comprising a molten carbonate type fuel cell, a fuel supply means for supplying the anode of the fuel cell with fuel of a reactive gas, a combustion means for combusting an anode discharge gas from the anode to form combustion products, a compression means for compressing air to produce a compressed air which is fed to the cathode of the fuel cell along with the combustion products, a turbine which is driven by an exhaust gas from the cathode, and a waste heat recovery means for recovering the heat of the exhaust gas from the turbine, characterizd in that a burning means is provided on a passage for the cathode exhaust gas fed to the turbine and a passage means is provided for introducing a part of the anode discharge gas into the combustion means, whereby unburned gas of the anode discharge gas is burned with the cathode exhaust gas having a relatively high temperature so that the temperature of the cathode exhaust gas to be fed to the turbine is raised greatly, and as a result, the overall thermal efficiency of the fuel cell power plant increases.

DESCRIPTION OF THE PREFERRED EMBODIMENTS

Figure 1:
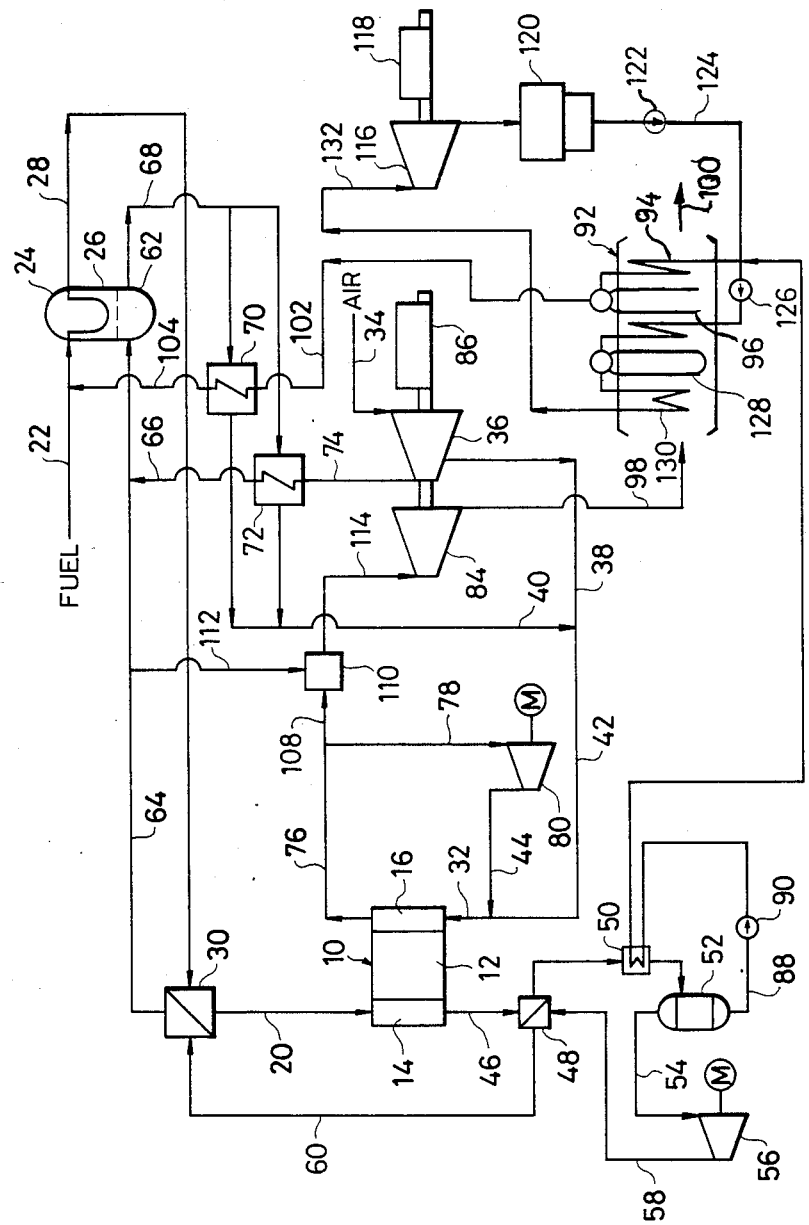
FIG. 1 is a schematic view of an embodiment of a fuel cell power plant in accordance with the present invention.

An embodiment of the fuel cell power plant will be described in detail hereinunder referring to the drawings.

FIG. 1 shows an embodiment of the fuel cell power plant employing a molten carbonate fuel cell according to the present invention. Referring to this Figure, a fuel cell 10 has an electrolyte 12 of a molten carbonate, an anode 14 and a cathode 16. The anode 14 is constituted by a negative electrode held in contact with the electrolyte, and a gas passage (not shown) provided on the side of the negative electrode opposite the electrolyte, while the cathode 16 is provided with a positive electrode held in contact with the electrolyte 12 and a gas passage (not shown) provided on the side of the positive electrode opposite the electrolyte. The fuel cell 10 is of stack constituted by a plurality of cell elements each having an electrolyte 12, an anode 14 and a cathode 16.

It is known that the thermal efficiency of a fuel cell increases as the pressure of the reactive gas increases. Therefore, a reactive gas 20 to be supplied to the anode 14 is prepared by, for example, supplying a natural gas as the fuel 22 pressurized to, for example, 6 to 10 kg/cm$^2$ to a reformer 24 provided with a reforming reaction pipe 26 and a combustion section 62 for supplying the pipe 26 with heat reforming the natural gas in the reforming reaction pipe 26 into a reformed gas 28 consisting mainly of hydrogen and carbon monoxide, and heating the reformed gas by a heat exhanger 30 up to about 600° C.

A mixture gas 32 supplied to the cathode 16 is prepared by compressing air 34 with a compressor 36, mixing the compressed air 38 with a combustion exhaust gas 40 from the reformer which will be described in detail later, and mixing a cathode circulated gas 44 with the mixture of compressed air 38 and the mixed gas 42.

The reactive gas 20 flowing into the anode 14 reacts with the mixture gas 32 consisting mainly of air and carbon dioxide and flowing into the cathode 16. The mixture gas 32 receives electrons in the cathode 16 to become ions which are introduced into the electrolyte. The reactive gas 20 reacts in the anode 14 with hydrogen and carbon ions in the electrolyte so as to form carbon dioxide and water, while emitting electrons; consequently, electrons travel from the anode 14 to the cathode 16, thereby producing electric current.

The exhaust gas 46 form the anode 14 contains carbon dioxide and water produced as a result of reaction between the hydrogen in the fuel and carbon ions in the electrolyte, as well as residual reactive gas which did not react with the mixture gas. The exhaust gas 46 is cooled by a heat exhanger 48 and is further cooled by a gas cooler 50. The cooled gas is then sent to a knockout drum (drain separator ) 52 in which water is separated to become a dry anode exhaust gas 54. The anode exhaust gas 54 from which water has been removed is compressed by a compressor 56 to become a compressed anode gas 58 which is then heated in the heat exchanger 48 through the heat exhange with the anode exhaust gas 46, thus becoming a hot anode gas 60. The hot anode exhaust gas 60 heats the reformed gas 28 as it flows through the heat exhanger 30. The anode exhaust gas 60 is then sent to the combustion section 62 of the reformer 24 as a combustion gas 64.

The reforming reaction conducted in the reformer 24 is an endothermic reaction, so that reforming the gas requires an external heat supply. The anode exhaust gas 46 is supplied as a burning gas 64 together with heated air 66 to the combustion section 62 of the reformer 24 so that a part of the anode exhaust gas 46 is burned to supply the reformer 24 with reaction heat. The combustion exhaust gas 68 generated in the combustion section 62 superheats the steam in a superheater 70 and preheats the compressed air 74 from the compressor 36 in an air preheater 72. The combustion exhaust after preheating the air 74 is then mixed with the compressed air 38 as mentioned above.

When it is possible to supply this power plant with water from a water source out of the plant, it is not necessary to separate and extract the water from the anode exhaust gas 46.

A part of the cathode exhause gas 76 from the cathode 16 is delivered as a cathode recirculated gas 78 to a compressor 80 to be compressed by the latter, and the compressed gas is supplied as a cathode recirculated gas 44 to the cathode 16 together with the mixture gas 42 as mentioned above. Since the fuel cell 10 operates at 600° to 750° C., the cathode exhaust gas 76 has a temperature of 700°-750° C. Also, the fuel cell operates at a pressure of 6–8 kg/cm$^2$. Therefore, the cathode gas 76 serves as a turbine driving gas for an expansion turbine 84.

In this embodiment, a combustor 110 and a passage for introducing a part 112 of the combustion gas 64 into the combustor 110 are provided for effectively raising the inlet temperature of a working gas for the turbine 84. The combustor 110 is provided on a passage through which the cathode exhaust gas is introduced into the expansion turbine 84. A part of the cathode exhaust gas 76, shunting from the cathode recirculated gas 78, is supplied as a combustion air 108 to the combustor 110. A part of the combustion gas 64, which is to be delivered to the combustion section 62 of the reformer 24, is delivered to the combustor 110 through the passage as the combustion gas 112. In the combustor 110, the combustion gas 112 as the fuel is burned using a part of the cathode exhaust gas 76 as the combustion air 108 to produce a combustion exhaust gas which is then delivered to the expansion turbine 84 as the turbine inlet gas 114. Thus, the expansion turbine 84 is driven by the expansion of the turbine driving gas 114, so that heat is recovered from the cathode exhaust gas 76. The expansion turbine 84 drives the compressor 36 connected thereto to compress the air 34 to a pressure of 6 to 10 kg/cm$^2$ thus producing compressed air 38 and drives a generator 86, thereby producing electric output.

The feedwater 88 separated from the anode exhaust gas 46 in the knock-out drum 52 is fed by a feedwater pump 90 and, after being heated by a gas cooler 50, delivered to a waste heat recovery apparatus 92. The water heat recovery apparatus 92 has an economizer 94, a low-pressure evaporator 96, a high pressure evaporator 128 and a superheater 130, and is heated by a turbine exhaust gas 98. The feedwater 88, condensed in the knock-out drum 52, and the feedwater 124, which has been fed forward by the condensate pump 120, rae delivered to the waste heat recovery apparatus 92. The steam 102 generated in the low-pressure evaporator 96 is sent to the superheater 70 superheated there by the combustion exhaust gas to be a superheated steam 104, and then mixed with the fuel 22. The superheated steam 104 mixed with the fuel 22 is sent to the reformer 24 and effects a reforming reaction in the reaction tube 26. Consequently, the fuel 22 of methane is reformed into a gas 28 consisting mainly of hydrogen and carbon monoxide.

The high-pressure evaporator 128 is supplied with the feedwater from the condenser 120 of a steam turbine 116 and generates steam. The steam is superheated in the superheater 130 and is supplied to the steam turbine 116 as the main steam 132. The main steam 132 works to drive the steam turbine 116 and a generator 118 connected thereto thereby to produce electric power and then becomes a condensate in the condenser 120.

In the power plant having the described construction, the overall thermal efficiency of the plant as a whole increases as compared with the conventional power plant set forth in the background of the invention, as will be seen from the data shown below.

In the conventional power plant, the whole part of the anode exhaust gas is supplied to the combustion section of the reformer. The rate of utilization of the reactive gas in this state is 74.5%, while the cell efficiency of the fuel cell and the thermal efficiency of the reformer are 55% and 131.4%, respectively. The thermal efficiency of the fuel cell represented as the product (cell efficiency)×(rate of utilization of reactive gas)×(-thermal efficiency of reformer) is 53.8% on the direct current base. Subtracting the loss in a DC/AC converter, the heat amounting to 52.8% of the heat input by the fuel 22 is turned into alternating current output. The remaining 46.2% of the energy, which did not take part in the production of electric power, is supplied in the form of the sensible heat of the cathode exhaust gas, sensible heat of the anode exhaust gas and the heat of the unused gas in the anode exhaust gas. However, the cathode exhaust gas is a compressed gas having a pressure of 6.2 kg/cm$^2$ and a temperature 700° C. This temperature is rather low for the turbine driving gas, so that the efficiency of the heat recovery cycle may be as low as 20%. Thus, the electric power produced by the generator driven by the expansion turbine amounts only to 9.4% of the fuel. Therefore, in the conventional power plant, total electric output power with respect to heat input by fuel is 62.2% which is the sum of 52.8% produced in the fuel cell and 9.4% produced in the generator.

In this embodiment, the rate of utilization of the fuel was set to be 60%, and about 40% of the anode exhaust gas was supplied to the combustor 110 as the combustion gas 112. At the same time, the cathode exhaust gas 76 was supplied to the combustor 110 as the combustion air 108. The combustion gas 64 which is an anode gas, i.e., the combustion gas 112, contains about 35% combustible components such as carbon monoxide and hydrogen, and has a calorific value of 1000 cal/Nm$^3$. The combustion air 108 has a pressure of 9 kg/cm$^2$ at a temperature of 700° C., and contains about 13% of oxygen. Therefore, by using a low-calorific value combustor which has been developed recently for the purpose of coal gasification power generation as the combustor 110, such as a catalytic combustion, the combustion gas 112 and the combustion air 108 can be subjected to a low-oxygen combustion with low calorific value.

Figure 7:
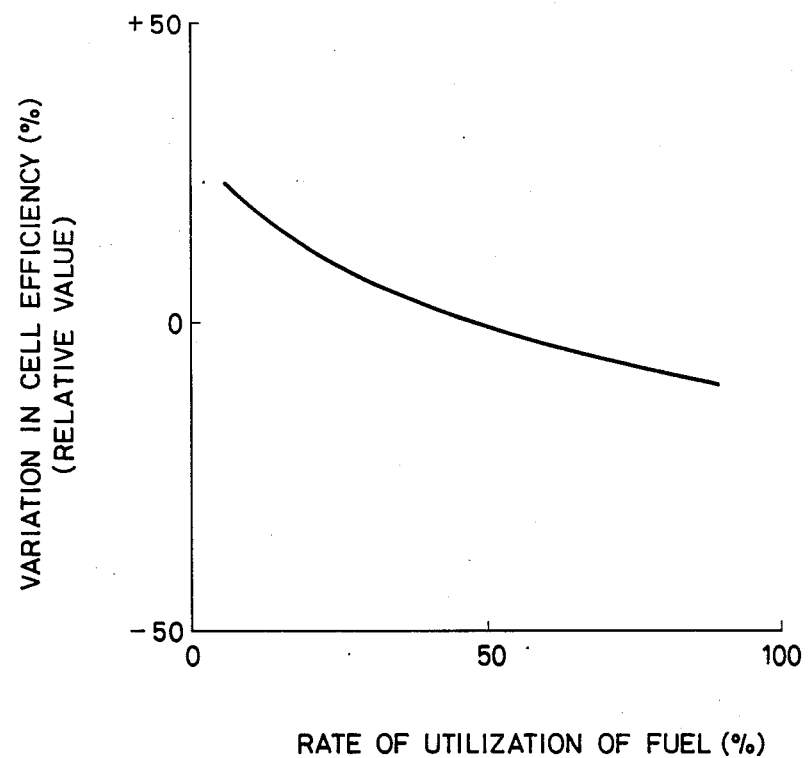
FIG. 7 is a chart showing the relationship between the rate of utilization of the fuel cell and the cell efficiency in the fuel cell.

In the embodiment shown in FIG. 1, since the rate of utilization of the reactive gas has been lowered to 60%, the efficiency of the cell has raised to 57.4% as can be seen from the characteristic chart shown in FIG. 7, which is a 4.4% increase as compared with the conventional plant. However, the rate of utilization of reactive gas, which is 60%, is 19.5% lower than that in the conventional plant. Consequently, the ratio of the power output of the fuel cell 10 of the embodiment to the heat input is 15.9% less than that of the conventional plant. More specifically, the proportion of the input of heat of fuel 22 was 45.3% on the direction current base and 44.4% on the alternating current base. The thermal efficiency of the reformer 24 was equal to that of the conventional plant.

The remainder of the output after electric power generation in the fuel cell 10 was 54.7% with respect to the heat input by the fuel 22, and a part of this output is used in the combustion of the combustion gas 112 and combustion air 108 in the combustor 110, so as to raise the temperature of the turbine inlet gas 114 which is to be supplied to the expansion turbine 84. As a result, the turbine inlet temperature was raised to about 950° C., 250° C. greater than that (700° C.) of the conventional plant. Consequently, the thermal efficiency of the expansion turbine 84 increased so that the electric output power of the generator 86 increase to 16.5% with respect to the heat input by the fuel 22. At the same time, the temperature of the turbine exhaust gas 98 was raised to about 490° C., as compared with the gas temperature of about 380° C. obtained in the conventional plant. Using this turbine exhaust gas 98 of 490° C., a reforming steam 102 was obtained through the low-pressure evaporator 96 of the heat recovery apparatus 92 and the thus obtained reforming steam 104 may be smoothly supplied to the reformer 24, the pressure thereof was set to 12 kg/cm$^2$. By using the turbine exhaust gas 98, main steam 132 of 40 kg/cm$^2$ and 420° C. was obtained through the high-pressure evaporator 128 and the superheater 130 of the heat recovery apparatus 92. This main steam 132 was supplied to the steam turbine 116, which, in turn, drove the generator 118, thus producing an electric power output amounting to 3.4% of the heat input by the fuel 22. Consequently, the efficiency of the waste heat recovery cycle was increased by 40%. The temperature of the waste gas 100 derived from the waste heat recovery apparatus 92 was as high as 200° C.

It is obvious from the foregoing description, that in the embodiment of the invention, the fuel cell produces an electric output power amounting to 44.4% of the heat input by the fuel 22, and electric power output amounting to 16.5% and 3.4% of the heat input by the fuel was produced, respectively, by the generator 86 driven by the expansion turbine 84 and by the generator 118 driven by the steam turbine 116. Thus, the plant produced total electric power which amounts to 64.3% of the heat input by the fuel, attaining a 3.2% increase in overall efficiency as compared with the conventional power plant.

Comparison examples for improving the efficiency of the waste heat recovery system will be explained hereinunder.

Figure 2:
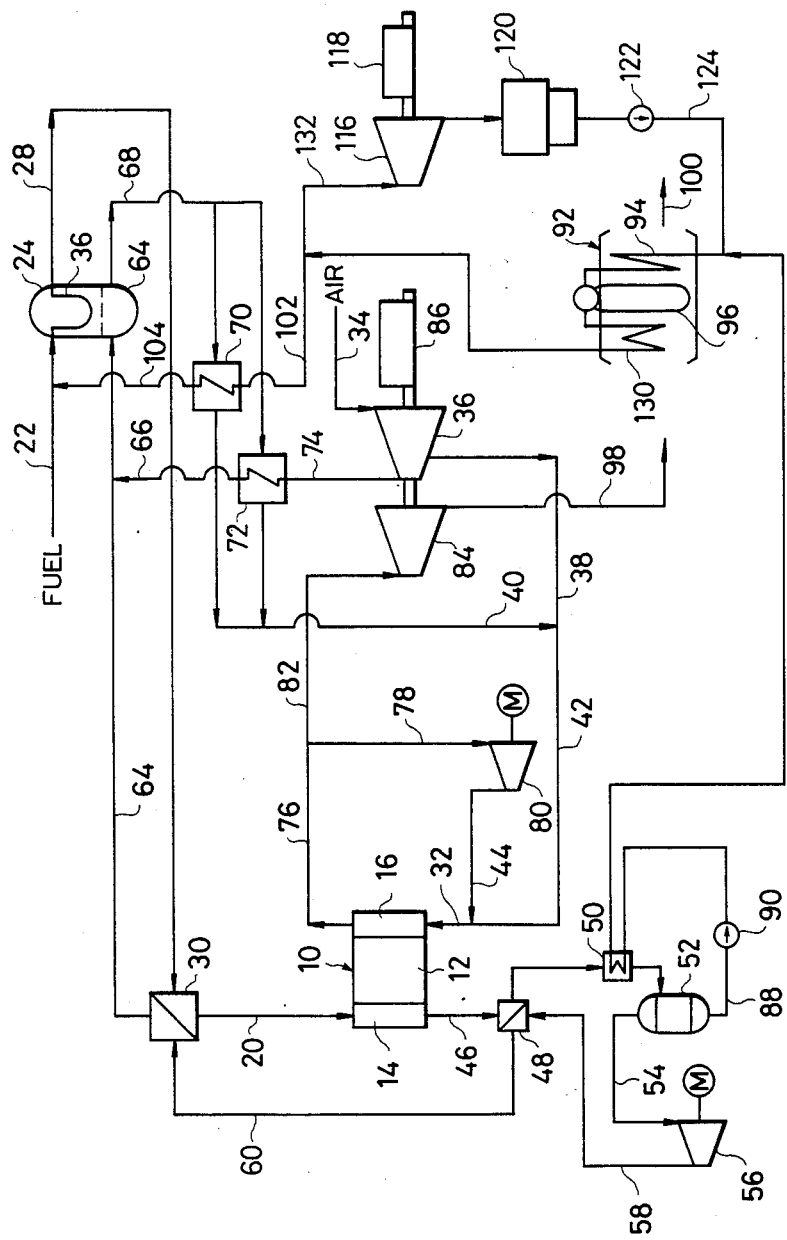
FIGS. 2 to 4 are schematic views of comparison examples of power plant using a molten carbonate type fuel cell, used for comparison of efficiency.

FIG. 2 shows a first comparison example which is the same as the above-mentioned conventional power plant, except that a steam turbine system and a superheater 130 are added to the conventional power plant. More specifically, the superheater 130 is provided in the waste heat recovery apparatus 92 such as to superheat the steam generated in the evaporated 96 thereby forming the reforming steam 102 which is then used as the main steam 132 for driving the steam turbine 116. In the power plant shown in FIG. 2, the temperature of the turbine driving gas 82, supplied to the expansion turbine 84, is substantially equal to that in the conventional power plant and depends on the temperature of the fuel cell. The temperature of the turbine driving gas 82, therefore, is as low as 700° to 750° C., so that the thermal efficiency of the expansion turbine 84 is correspondingly low. On the other hand, the temperature of the turbine exhaust gas 98 is as low as 300° to 400° C., so that the energy of the main steam 132 cannot be increased. Also, a part of the steam generated in the heat recovery apparatus 92 has to be supplied to the reformer 24 as a reforming steam 102, so that the quantity of main steam 132 is inadequate. Therefore, the provision of the steam turbine 116 provides only 0.9% increase of thermal efficiency which is relatively small. In the power plant shown in FIG. 2, therefore, the ratio between the cell output and the steam turbine output is about 50:1. Since the output of the steam turbine is much smaller than the cell output, it is quite difficult to effect a safisfactory cycle.

Figure 3:
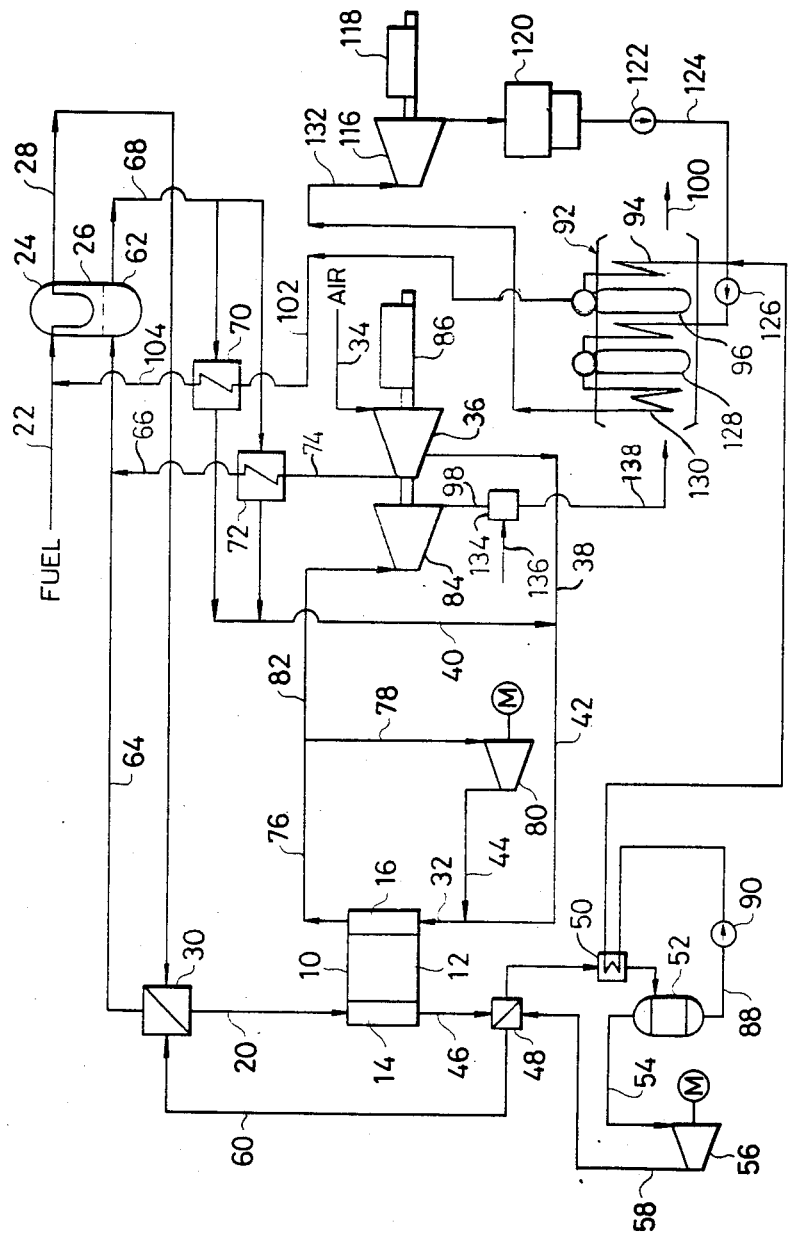

FIG. 3 shows a second comparison example in which the turbine exhaust gas 98 is led as the combustion air to an exhaust gas auxiliary burning device 134 which receives also a fuel 136. As a result of burning of the fuel in the exhaust gas auxiliary burning device 134, the temperature of the gas 138 at the inlet of the waste heat recovery apparatus is increased to 490° C. in contrast to the temperature of 390° C. attained in the conventional power plant, thus achieving an increase in the energy possessed by the main steam 132. Consequently, the power output is increased by about 5.5% with respect to that attained in the conventional plant. In order to raise the temperature of the gas 138 at the inlet of the waste gas recovery apparatus 92 up to about 490° C., however, it is necessary to supply additional fuel 136 to exhaust gas auxiliary burning device 134, the quantity of the additional fuel 136 amounting to about 9% of the fuel 22 supplied to the reformer 24. This causes a 0.8% reduction of thermal efficiency with respect to the conventional power plant. Auxiliary burning of the turbine exhaust gas 98, therefore, does not produce any remarkable effect in the increase of thermal efficiency of the power plant as a whole.

Figure 4:
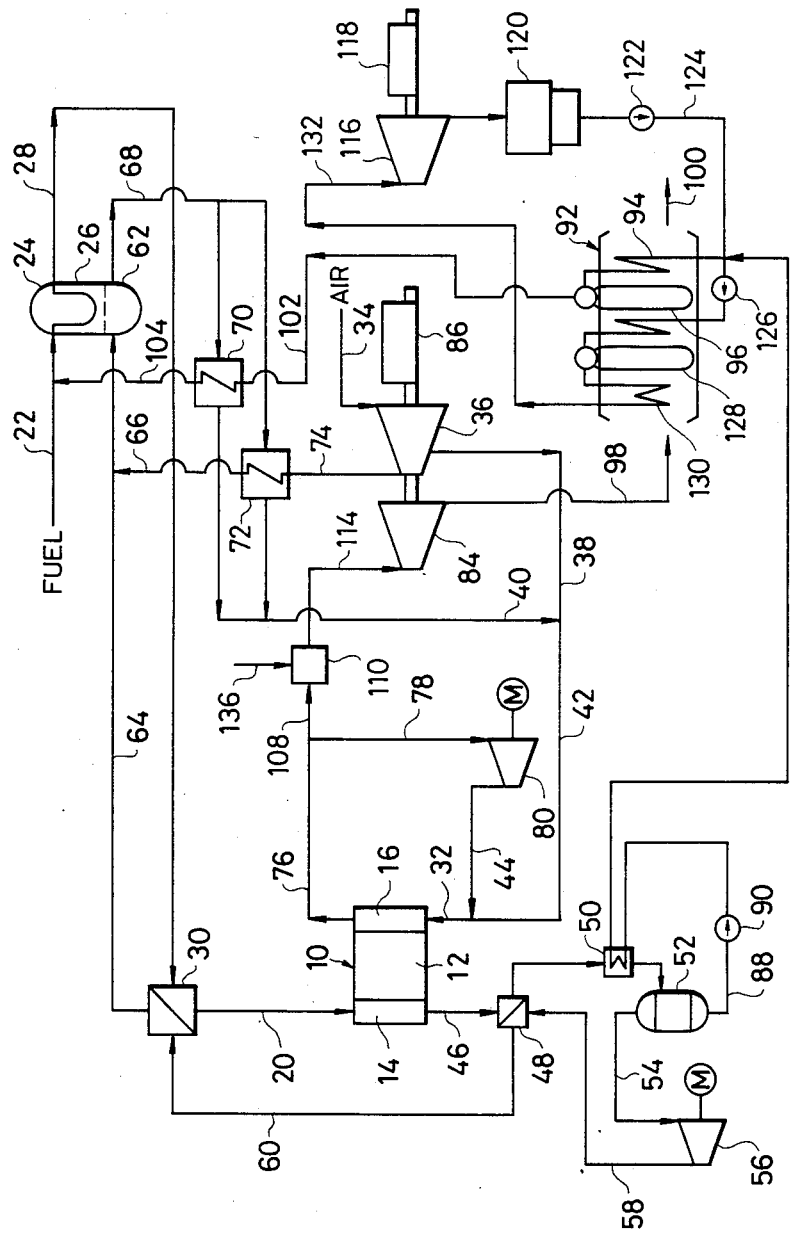

FIG. 4 shows a third comparison example in which a combustor 110 is provided at the inlet side of the expansion turbine 84. The combustor 110 is supplied with auxiliary fuel 136, as well as the cathode exhaust gas 76 as the combustion air 108. The fuel 136 is burned in the combustor 110 so as to raise the temperature of the gas at the turbine inlet. As a result, the temperature of the gas 114 at the turbine inlet increases from about 700° C. to about 940° C. for example.

In order to effectively operate the expansion turbine 84, the operating pressure of the fuel cell 10 is increased so as to raise the pressure of the gas 114 at the turbine inlet from about 6 kg/cm² to about 9 kg/cm². Consequently, the electric output power of the generator 86 through the expansion turbine 84 is increased to twice that attained by the conventional power plant.

Consequently, the rate of increase of the output power with respect to the heat input by the fuel 22 is increased by 11% as compared with the conventional power plant. Also, the temperature of the turbine exhaust gas 98 is increased so that the steam turbine 116 can produce an output which amounts to 5.5% of the output of the conventional power plant, as in the case of the comparison example explained in FIG. 3. At the same time, thermal efficiency is increased by 17%. However, since the additional supply of the fuel 136 amounting to 20% of the fuel 22 to the combustor 110, is necessary to raise the temperature of the gas 114 at the turbine inlet, the increase of overall thermal efficiency in the whole plant is as slight as 1% as compared with that of the conventional power plant.

Figure 5:
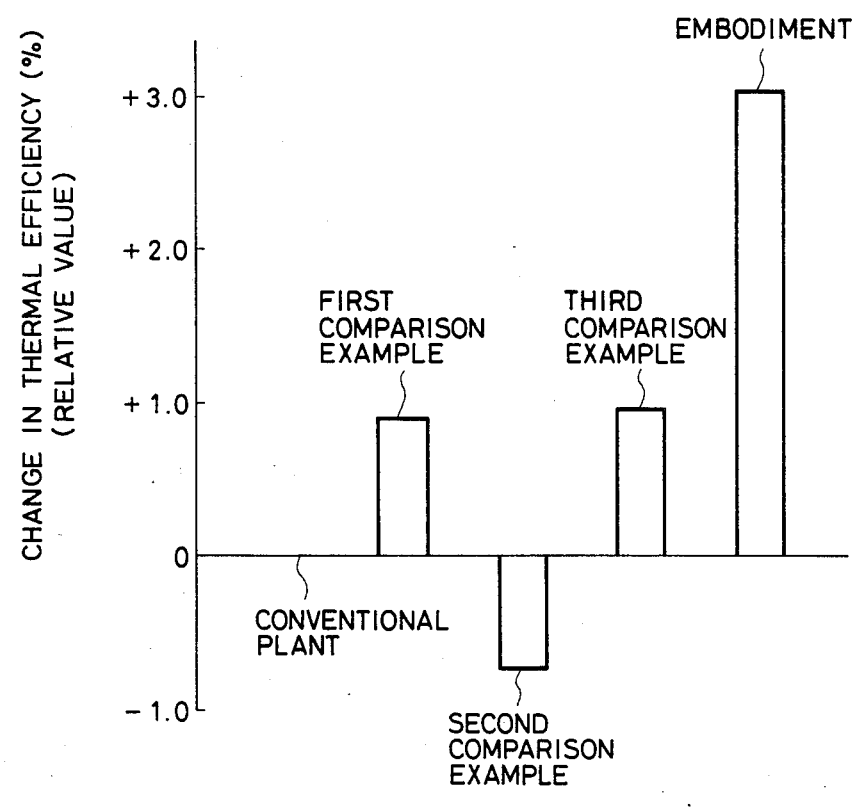
FIG. 5 is a chart showing thermal efficiency of the embodiment shown in FIG. 1 and the comparison examples shown in FIGS. 2 to 4, in comparison with the efficiency of a conventional power generating plant.

FIG. 5 shows the value of increase in thermal efficiency attained in the embodiment of the invention together with the values of increase of thermal efficiency attained by the comparison examples shown in FIGS. 2 to 4, in comparison with thermal efficiency attained by the conventional power plant set forth in the background of the invention.

Figure 6:
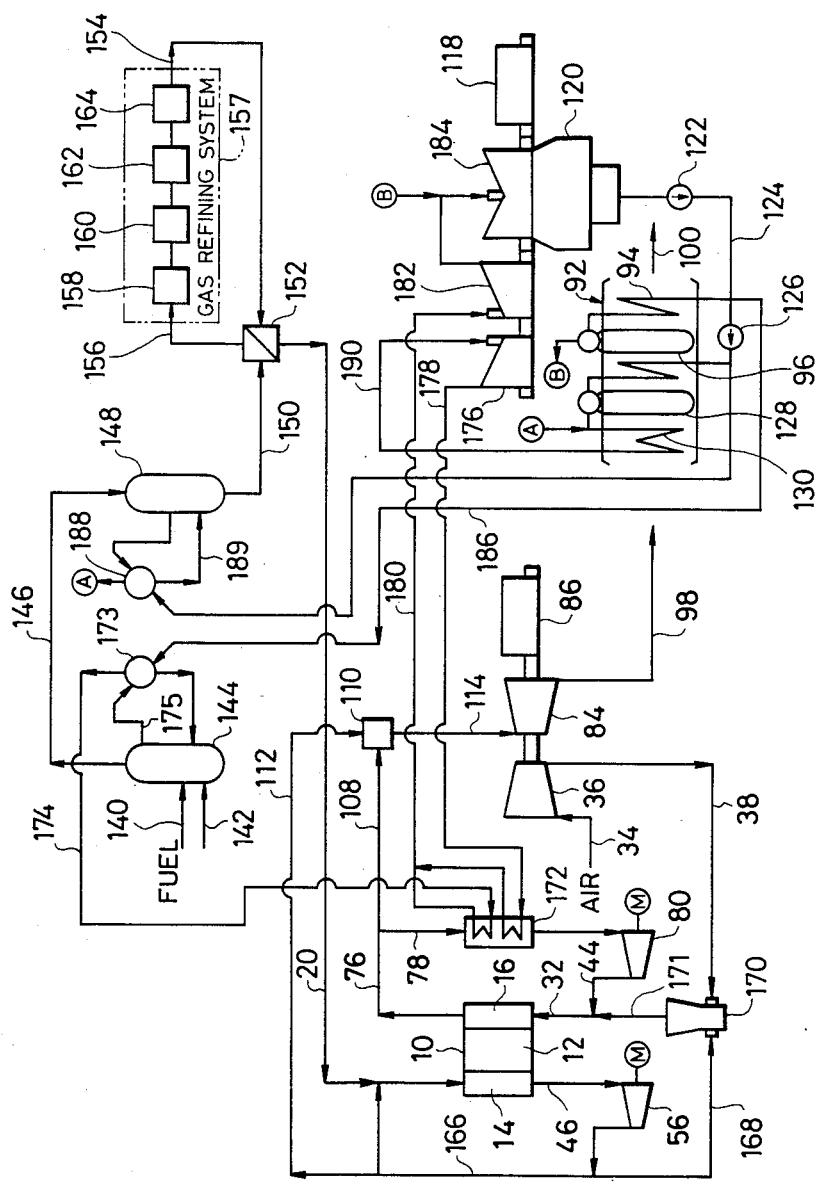
FIG. 6 is a schematic view of another embodiment of the molten carbonate type power plant equipped with a coal gasification system.

FIG. 6 shows the embodiment of the fuel cell power plant in which a coal gasification system is combined with a molten carbonate fuel cell, so as to permit the use of coal as fuel. In FIG. 6, the coal 140 as fuel is delivered to a gasification furnace 144 together with gasification agents 142 such as oxygen and air. As a result, a gasified crude gas 146 is produced and is used for superheating a feedwater, which will be described later, in a gasification furnace outlet steam generator 148. The crude gas 150 from the gasification furnace outlet steam generator 148 effects a heat exchange with the refined gas 154 in the heat exchanger 152 and is then refined.

The crude gas 156 after the heat exchange is refined through a gas refining system 157 consisting of ammonia scrubbing tower 158, carbonyl sulfide converter tower 160, desulfurization tower 162 and refining desulfurization tower 164, thus becoming refined gas 154. The refined gas 154 is heated by crude gas 150 in heat exchanger 152 and is supplied as reactive gas 20 to the anode of fuel cell 10.

A part of the anode exhaust gas 46, after compression by the compressor 56, is changed into an anode recirculating gas 166, and is supplied to the anode 14 together with the refined gas 20. The remaining part of the compressed anode exhaust gas is supplied to a combustor 170 as burning gas 168. In the combustor 170, burning gas 168 is burned by means of the compressed air 38 to generate a combustion gas 171 which is delivered to cathode 16 together with cathode recirculated gas 44.

In the embodiment of FIG. 6, a combustor 110 is provided in the passage through which a part 108 of the cathode exhaust gas 76 is introduced to the expansion turbine 84, while another part become a cathode recirculated exhaust gas 78. A part of the anode exhaust gas 46 as a combustion gas 112 is introduced into the combustor 110 which receives also the cathode exhaust gas 108 as combustion air. The anode exhaust gas 112 is burned under the presence of the cathode gas 108 by the combustor 110. The combustion product 114 is introduced into the expansion turbine 84 as a working gas. The turbine exhaust gas 98, is discharged to the outside of the system as the exhaust gas 100, after a heat exchange with economizer 94, evaporators, 96, 128 and a superheater 130 in the waste heat recovery apparatus 92. A part 186 of condensate 124 from a condenser 120 of a steam turbine system including turbines 176, 182 is sent to a gasfication furnace steam generator 173 as a feedwater 186 by a feed pump 122, and is converted into steam which is transferred to a superheater 172. Another part of the condensate is sent as a feed water to a gasification furnace steam generator 188 by a feed water pump 126. The feed water is heated by circulated crude gas 189 to produce steam. The steam generated there is sent to a superheater 130 of the heat recorery apparatus 92 through a line A-A along with the steam generated by an evaporator 128 and then is supplied in the turbine 176 as a main steam 190. The exhaust steam from the turbine 176 is sent to the superheater 172.

In a superheater 172, the cathode recirculated gas 78 superheats both the steam 174 from a gasification furnace steam generator 173 of the coal gasification system and the steam 178 from the steam turbine 176, thus producing superheated steam 180 which is delivered to the steam turbine 182. The steam, after driving the steam turbine 182, enters the steam turbine 184 with the steam from the evaporator 96, drives it and is then condensed in the condenser 120. The steam turbines 176, 182 and 184 drive the generator 118, so as to output electric power. The feedwater 186 supplied to the gasification furnace steam generator 173 is heated by the gasification furnace recirculated gas 175 to become saturated steam 174, because the temperature of the metal constituting the wall of the gasification furnace 144 is limited by its effect on the durability of the metal. The saturated steam 174 is then delivered to the superheater 172 as above-mentioned.

The efficiency of the fuel cell power plant with the coal gasification system of this embodiment will be compared with the efficiency of a conventional fuel cell power generating plant with a coal gasification system without the combustor 110. In the conventional plant, the rate of utilization of fuel was 85%, while cell efficiency was 52.5%. The rate of conversion of coal into reactive gas attained by gasification was 77%. Efficiency of the fuel cell, rate of utilization of the reactive gas and the rate of conversion into reactive gas are defined as:

(cell efficiency)
= (fuel cell electric output (KW)×860 (Kcal/KWH)- /calorific value of reactive gas used in fuel cell).
= (calorific value of reactive gas used in fuel cell)/- (calorific value of reactive gas supplied to fuel cell).

(rate of fuel conversion) (=thermal efficiency of reformer)=(calorific value of reactive gas supplied to fuel cell)/(calorific value of fuel supplied to fuel conversion system).

The fuel cell 10 produces an electric power output which amounts to 34.2% of the coal heat input on the direct current base and 33.5% of the same on the alternating current base when the loss in the DC/AC converter is considered.

The heat which could not be utilized in the fuel cell 10 is recovered in the gas turbine combined. However, since the temperature at the inlet of the expansion turbine 84 is as low as 700° C., the thermal efficiency of the gas turbine combined is as low as 33.7% so that only 22.2% of the coal heat input can be utilized in the combined gas turbine configuration. Therefore, the total electric power output of the power generating plant as a whole is 55.7% of the coal heat input.

In the embodiment shown in FIG. 6, the rate of utilization of the reactive gas is reduced from 85% to 70%, so that the efficiency of the fuel cell 10 is 54%. The electric power output of the fuel cell is calculated to the 29.1% on the direct current base, and 28.5% on the alternating current base.

In the described embodiment, therefore, cell efficiency can be increased by 3.4% as compared with the above-mentioned conventional case, so that the reduction of the ratio of the cell output with respect to the coal heat input can be held down to 14.9%, despite the 17.7% reduction in the rate of utilization of fuel. The energy which could not be taken out as the electric power output from the fuel cell amounts to 70.9% of the coal heat input. Among this unused energy, some part possessed by the anode recirculated gas 166 can be recovered as follows. About 50% of the anode recirculated gas 166 is supplied as combustion gas 112 to the combustor 110 which receives also a part of the cathode exhaust gas 76 as combustion air 108, so that combustion gas 112 is burnt in combustor 110. This combustion air has a pressure of 7.4 kg/cm² and a temperature of 700° C. As a result of burning combustion gas 112 with combustion air 108 in combustor 110, the temperature of the gas 114 at the turbine inlet was 200° C. higher than the temperature of the cathode exhaust gas 76. As a result, the thermal efficiency of the gas turbine combined plant was raised to 40%, which amounts to an 18.7% increase with respect to that attained in the conventional system. Consequently, the gas turbine combined plant could provide an electric output amounting to 28.3% of the coal heat input. Therefore, total electric output power from the plant of this embodiment increased to 56.8% which is the sum of 28.5% produced by the fuel cell 10 and 28.3% produced by the gas turbine combined plant, thus attaining a 2% increase over that (55.5%) produced by the conventional plant.

What is claimed is:

1. A fuel cell power plant having a fuel cell containing an electrolyte of molten carbonate, a fuel gas supplying apparatus adapted to supply the anode of said fuel cell with a reactive gas, a compressor to supply the cathode of said fuel cell with compressed air, a combustor to burn the exhaust gas from said anode and to supply the burned exhaust gas to the cathode, a turbine adapted to be supplied with the exhaust gas from said cathode through a cathode exhaust gas passage and adapted to drive said compressor and a generator, and a waste heat recovery apparatus adapted to supply the fluid after heat exchange with the exhaust gas from said turbine to said fuel gas supplying apparatus, characterized by comprising combustion means provided on said cathode exhaust gas passage and an anode exhaust gas supply passage to supply, as a fuel, the anode exhaust gas from said anode to said combustor, whereby the anode exhaust gas is burned with the cathode exhaust gas.

2. A fuel cell power plant according to claim 1, wherein said fuel gas supplying apparatus is a reformer which reforms said fuel gas containing hydrogen into a gas which consists mainly of hydrogen and carbon monoxide, while said combustor for burning the exhaust gas from said anode is a combustion section of said reformer.

3. A fuel cell power plant according to claim 1, wherein said fuel gas supplying apparatus is a gasification furnace for gasifying coal.

4. A fuel cell power plant according to claim 1, wherein said fluid which effects heat exchange through said waste heat recovery apparatus is steam, and wherein a part of said steam is supplied to said fuel gas supplying apparatus while the other part is supplied to a steam turbine.

5. A fuel cell power plant according to claim 4, wherein said waste heat recovery apparatus includes a low-pressure evaporator to supply steam to said fuel gas supplying apparatus, and a high-pressure evaporator adapted to supply the steam to said steam turbine.

6. A fuel cell power plant comprising:
a fuel cell having an anode, a cathode and an electrolyte of a molten carbonate disposed between said anode and said cathode;
a fuel reformer for reforming a fuel to be fed to said fuel cell thereby to produce a reactive gas;
a first gas passage means for introducing a reactive gas from said reformer to said anode of said fuel cell;
a first combustor for combusting a part of gas exhausted from said anode;
a second gas passage means for introducing anode exhaust gas to said first combustor;
a compressor for compressing air;
a third gas passage means for introducing a compressed air from said compressor into said cathode of said fuel cell;
a fourth passage means for introducing combustion exhaust gas from said first combustor into said cathode of said fuel cell;
a turbine connected to said compressor and driven by gas;
a fifth gas passage means for introducing a gas exhausted from said cathode of said fuel cell into said turbine thereby driving said compressor;
a second combustor provided on said fifth gas passage means;

a sixth gas passage means for introducing into said second combustor, a part of the anode exhaust gas, whereby the temperature of a gas to be fed to said second combustor is raised;

a heat recovery means for recovering the heat of the exhaust gas exhausted from said turbine, said heat recovery means having an economizer and a steam generator; and a steam turbine driven by steam generated by said steam generator.

* * * * *